No. 747,054. PATENTED DEC. 15, 1903.
D. W. FAGALDE.
PITMAN CONNECTION.
APPLICATION FILED JAN. 3, 1903.
NO MODEL.
FIG. 1.
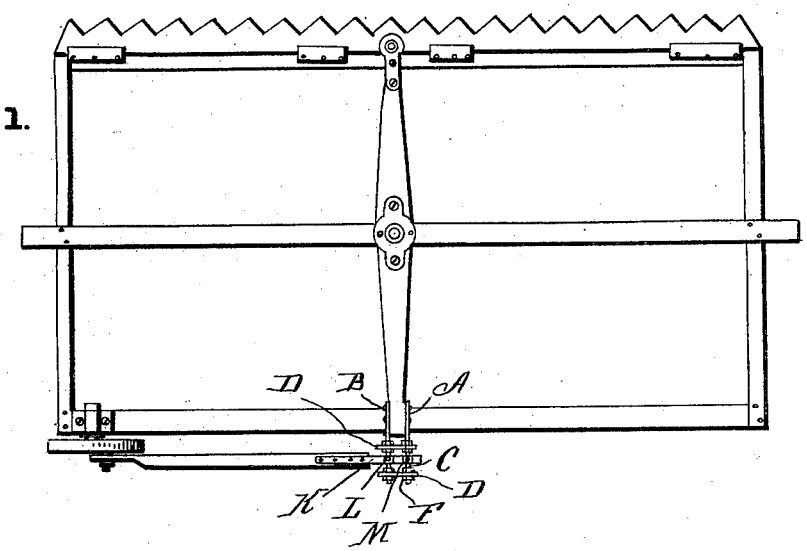
FIG. 2.
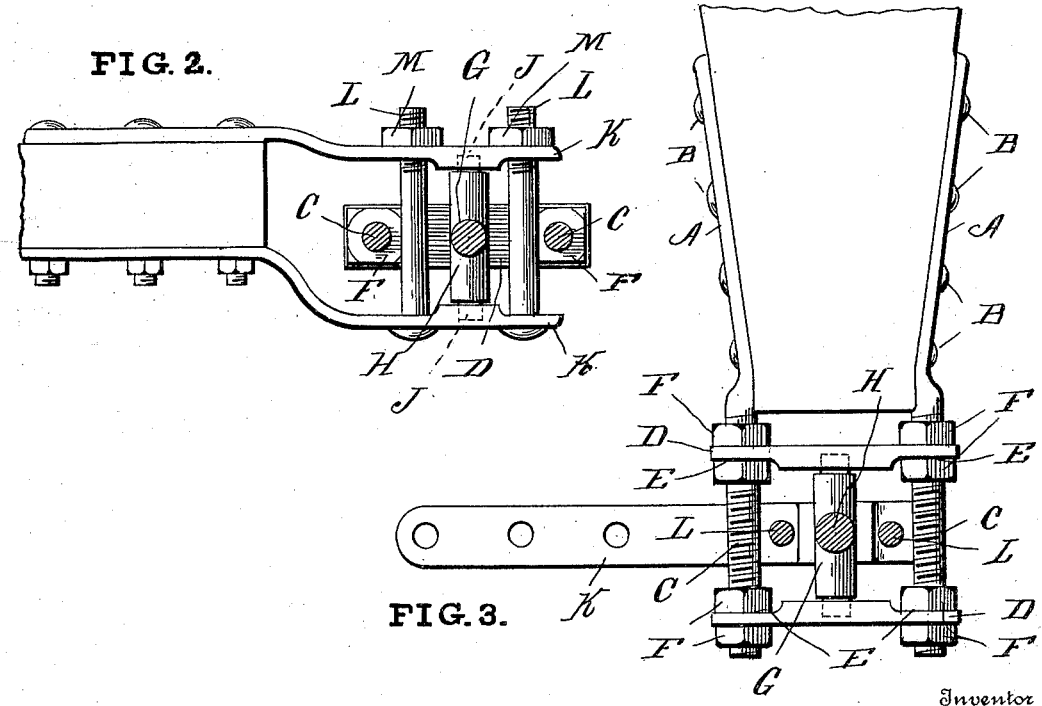
FIG. 3.
Witnesses
Chas. K. Davis.
M. E. Moore
Inventor
Daniel W. Fagalde.
By Wm. N. Moore
Attorney No. 747,054. Patented December 15, 1903.

UNITED STATES PATENT OFFICE.

DANIEL W. FAGALDE, OF DOUGLAS, OREGON.

PITMAN CONNECTION.

SPECIFICATION forming part of Letters Patent No. 747,054, dated December 15, 1903.

Application filed January 3, 1903. Serial No. 137,634. (No model.)

*To all whom it may concern:*

Be it known that I, DANIEL W. FAGALDE, a citizen of the United States, residing at Douglas, in the county of Morrow and State of Oregon, have invented certain new and useful Improvements in Pitman Connections, of which the following is a specification.

My invention relates to improvements in pitman connections or, in fact, any connection or bearing where it is desired to give a pitman or arm a combined vertical, lateral, and oscillating or rotary motion, forming a practically universal joint.

The object of my invention is the provision of a connection of simple, inexpensive, and practical construction, which can be easily adjusted, which prevents lost motion, and will wear for a very long period.

With these objects in view my invention consists of a connection or bearing embodying novel features of construction and combination of parts, substantially as disclosed herein.

Figure 1 represents a plan view of my invention applied to a mowing-machine to show its application. Fig. 2 represents a vertical sectional view, and Fig. 3 represents a horizontal sectional view.

In the drawings, A designates two bars adapted to be secured in proper position by suitable fastenings B, these bars having one of their ends formed with threads or threaded stems C, and upon these stems are placed the parallel bearing-plates D, which are formed with seats or bearings E, and these plates are held in their proper adjustment by means of the series of adjusting-nuts F, which nuts are arranged as shown and serve to adjust the plates and to take up any wear on the bearing. It will be seen that I employ four sets of these adjusting-nuts, which are arranged to bear in pairs upon the ends of the bearing-plates. In the bearings of said plates is mounted the vertical stud G, which is formed with a pair of lateral arms H, which arms bear in seats or bearings J in the pair of plates or arms K, which are bolted together by the screw-threaded rods L, upon which threaded rods are nuts M, which serve to adjust the rods to the bearing on the horizontal bearing-arm, and to the plates K is connected the pitman or other machinery to which it is desired to give the universal motion.

From the foregoing description, taken in connection with the drawings, it will be observed that I provide a frame in which is mounted a cross-shaped bearing connection which permits of a practically universal motion and that the bearing can be easily and perfectly adjusted, which will prevent any lost motion and which is entirely practical in every particular.

I claim—

1. In a pitman connection, a pair of plates having sockets in their adjacent faces, means adjustably connecting said plates, plates disposed at right angles to the first-mentioned plates and having sockets on their adjacent faces, a stud having bearings in the sockets of the first-mentioned plates, arms extending from said stud and having bearings in the sockets of the last-mentioned plates, and independent means for adjusting said last-mentioned plates.

2. In a pitman connection, the combination of a pair of plates having sockets in their inner opposite faces, bolts adjustably connecting said plates on each side of said sockets, a stud or post mounted in said sockets, arms extending from said post, and a pair of plates connected with the arms on said post.

3. In a pitman connection, the combination of a pair of bars having threaded stems, parallel bearing-plates mounted on said stems and formed with sockets on their adjacent faces, adjusting means on said stems upon opposite sides of said plates, a pair of plates disposed at right angles to the first-mentioned plates and having sockets upon their adjacent faces, adjusting means connecting said plates, and a stud mounted in the sockets of one pair of plates and having lateral arms mounted in the sockets of the other plates, the last-mentioned plates being adapted for connection with the pitman.

In testimony whereof I affix my signature in presence of two witnesses.

DANIEL W. FAGALDE.

Witnesses:
D. W. McFADEN,
J. E. GORMAN.